United States Patent Office 3,061,387
Patented Oct. 30, 1962

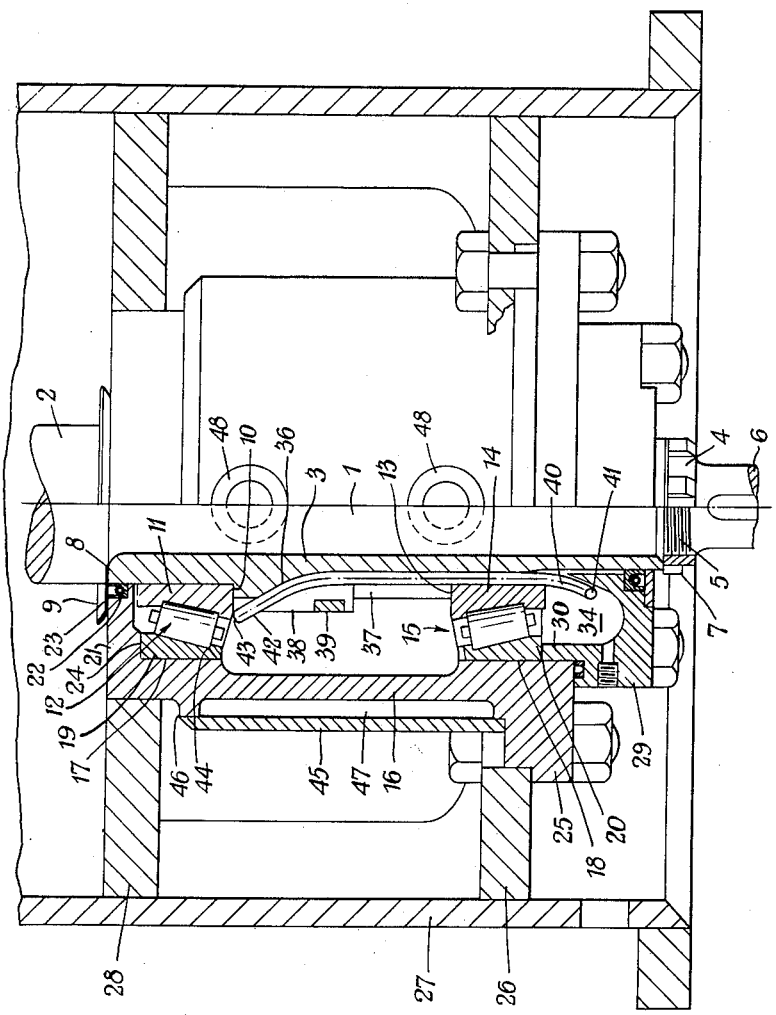

3,061,387
ANTI-FRICTION BEARINGS FOR
ROTATING SPINDLES
Peter Laws, 55 Gloucester Ave., London NW. 1, England
Filed Aug. 9, 1960, Ser. No. 48,495
4 Claims. (Cl. 308—187)

This invention relates to an arrangement for lubricating anti-friction bearings and is more particularly, but not exclusively, concerned with the lubrication of an anti-friction bearing utilising ball or roller bearings.

It is an object of the present invention to provide a totally enclosed bearing having its own lubricant reservoir, which can be used as a spindle, or shaft, journal for vertical spindles or shafts.

According to the present invention there is provided in or for a bearing for a vertically rotatable shaft, means for feeding lubricant from a lubricant reservoir to a region to be lubricated which is above the reservoir, wherein one open end of a conduit which is arranged to be rotatable with the shaft, points in the direction of rotation of the shaft and dips into the reservoir, the other open end of the conduit opening towards the region to be lubricated whereby lubricant is fed continuously from the reservoir to said region when the shaft attains a critical speed.

For a better understanding of the invention and to show how the same may be carried into effect reference will now be made to the accompanying drawing which is a sectional elevation of a journal bearing for a vertical shaft or spindle.

The lower end portion 1 of a vertical shaft or spindle 2 is reduced in diameter. A sleeve 3 is a force fit on the lower end portion 1, the sleeve 3 being prevented from axial movement along the shaft end by a locking nut 4 engaging a threaded portion 5 at the lowermost end 6 of the shaft 2. The nut 4 bears on the lower end of the sleeve 3 through the intermediary of a locking washer 7 and urges the sleeve 3 towards the step or collar 8 formed by the reduction in spindle diameter to produce the reduced diameter at the lower end of the spindle. An annular dished plate 9 acting as a water flinger is interposed between the upper end of the sleeve 3 and the collar 8.

The upper end of the sleeve 3 is reduced in diameter to provide an annular radially directed step 10 which acts as a supporting and locating surface for the inner race 11 of an upper thrust roller bearing 12, the inner race being a force fit upon the sleeve 3. The lower end of the sleeve 3 is likewise reduced in diameter to provide a further annular radially directed step 13 which acts as the upper locating and thrust surface for the inner race 14 of a lower roller thrust bearing 15. The upper and lower roller bearings 12 and 15 are preferably a matched pair.

A second sleeve 16 concentric with the sleeve 3 has axially directed seating surfaces 17 and 18 for the outer races 19 and 20 of the roller bearings 12 and 15.

An inwardly directed flange 21 is formed at the uppermost end of the second sleeve 16, the inward flange 21 making a running clearance within the outer surface of the uppermost end of the sleeve 3. An oil seal 22 is located in an annular recess 23. The flange 21 also provides an annular radially directed thrust surface 24 for the outer race 19 of the upper bearing 12. An outwardly directed annular flange 25 is provided around the lower part of the sleeve 16. This outwardly directed flange 25 is bolted to a plate 26 which is part of a housing 27 which is at rest relative to the spindle 1, and associated with a turbine or the like (not shown) of which the spindle 1 acts as the output shaft. This housing includes a second plate 28 which may be a stiffening rib in the housing 27, the second plate 28 being apertured to receive the upper end of the outer sleeve 16 as a force fit. A cover plate 29 is attached to the lowermost end of the sleeve 3, the cover plate 29 having a portion 30 of reduced diameter which engages, as a close fit, the inside face of the sleeve 16. The annular upper surface of the portion 30 provides a thrust or seating surface 31 for the outer race 20 of the lower bearing 15. If necessary a shim or other distance piece is interposed between the outer race 20 and the adjacent upper surface 31.

An oil seal 32 is provided between the cover plate 29 and the lower part of the rotatable sleeve 3, the oil seal 32 being held in position by means of an annular plate 33 which is screwed to the cover plate 29.

A deep annular groove 34 of substantially U-cross section is formed in the cover plate 29, the inner side wall 35 of the groove being inclined relative to the axis of the shaft. The groove 34 acting as a lubrication oil reservoir.

A narrow bore tube 36 is fitted in an axially directed groove 37 formed in the sleeve 3. The tube 36 is held in the axial groove 37 by a combined oil plunger and keeper key 38 which is held in position by a retaining ring 39. The lower end 40 of the tube 36 is deformed with respect to the tube axis so that the mouth 41 of the lower end of the tube faces in the direction of rotation of the shaft 1.

The upper end 42 of the tube 36 is deformed outwardly so that the mouth 43 of the upper end of the tube faces towards or contacts the upper bearing 12, the mouth 43 being so positioned that it aligns with the roller cage 44 of the upper bearing 12.

A further sleeve 45 is secured to the sleeve 16, the upper end of the further sleeve 45 being fixedly secured to an outwardly directed radial flange 46 on the sleeve 16, and the lower end of the further sleeve 45 is fixedly secured to the outwardly directed flange 25 on the sleeve 16. The further sleeve 45, sleeve 16 and the flanges 25 and 46 define a cylindrical space 47 through which coolant can be pumped. Coolant inlet and outlet connections 48 are provided in the further sleeve.

When the spindle or shaft 1 is rotating in a clockwise direction the mouth 41 of lower end 40 of the tube 36 is effectively fed into the oil in the reservoir 34 so that the oil tends to rise up through the tube 36. As the speed of the shaft 1 is increased a critical speed is attained at which the oil rises sufficiently high in the tube or conduit to be fed out from the top end 42 of the tube to spray against the upper bearing 12. The oil is forced into the bearing 12 and then drains downwards towards and through the lower bearing 15 thereby lubricating same on its way back to the oil reservoir groove 34.

What I claim is:
1. A bearing for a vertically rotatable shaft, comprising an anti-friction bearing assembly, a lubricant reservoir located below the bearing assembly, a vertically arranged tube rotatable with the shaft, the upper and lower ends of the tube being open, the lower end of the tube dipping into the reservoir and being inclined away from the axis of the shaft and towards the direction of rotation of the shaft so that the lower end extends substantially tangentially to the shaft axis, and the upper end of the tube being directed outwardly away from the shaft towards the bearing assembly, the arrangement being such that rotation of the shaft at speeds from a critical speed causes lubricant to be continuously fed via the tube from the reservoir to the bearing assembly, and wherein the tube is led through a first sleeve which is co-axially mounted on the shaft and which is arranged to carry the inner race of the bearing assembly.

2. The invention as defined in claim 1 where in a second sleeve co-axial with the first is arranged to carry the outer race of the bearing assembly, and wherein the lower end of the second sleeve is fitted with a cover plate which constitutes the lubricant reservoir.

3. The invention as defined in claim 2 wherein the first and second sleeves, the cover and an outwardly directed annular flange at the upper end of the second sleeve combine to form a totally enclosed housing for two axially spaced anti-friction bearings for the shaft.

4. The invention as defined in claim 2 wherein a coolant jacket surrounds the second sleeve, the arrangement being such that coolant can be circulated through the jacket to provide continuous cooling of the lubricant and the bearing assembly.

References Cited in the file of this patent

UNITED STATES PATENTS

| | | |
|---|---|---|
| 657,219 | Jackson | Sept. 4, 1900 |
| 1,037,217 | Diehl | Sept. 3, 1912 |
| 1,200,881 | Sargent | Oct. 10, 1916 |
| 1,736,966 | Delaval-Crow | Nov. 26, 1929 |
| 1,975,612 | Nystrom | Oct. 2, 1934 |
| 2,243,961 | Howarth | June 3, 1941 |
| 2,558,308 | Miller | June 26, 1951 |
| 2,959,456 | Jones | Nov. 8, 1960 |

FOREIGN PATENTS

| | | |
|---|---|---|
| 854,729 | Germany | Nov. 6, 1952 |